(No Model.)
C. FULLER & J. H. CUNNINGHAM.
VEHICLE BRAKE GEAR.
No. 395,746. Patented Jan. 8, 1889.
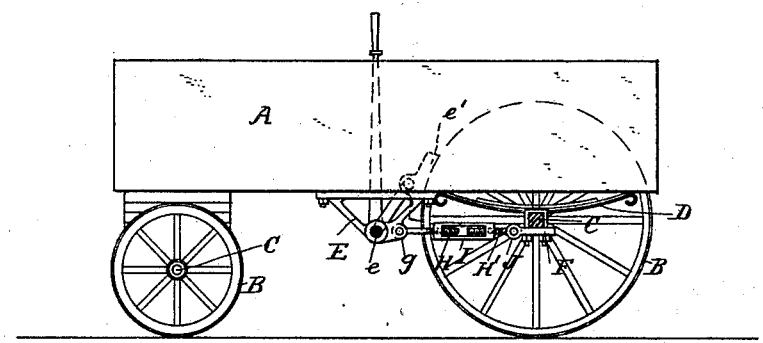
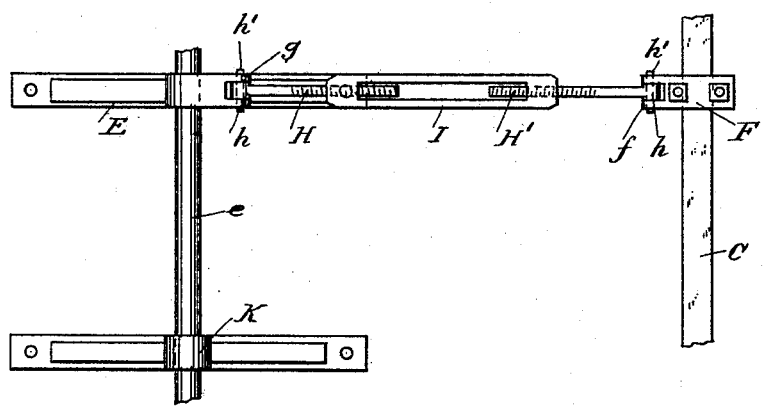
Witnesses,
Inventors
Chas. Fuller.
and J. H. Cunningham
By their Attorney
Herbert W. T. Jenner.

UNITED STATES PATENT OFFICE.

CHARLES FULLER AND JOHN HENRY CUNNINGHAM, OF LUDELL, KANSAS.

VEHICLE BRAKE-GEAR.

SPECIFICATION forming part of Letters Patent No. 395,746, dated January 8, 1889.

Application filed March 27, 1888. Serial No. 268,697. (No model.)

*To all whom it may concern:*

Be it known that we, CHARLES FULLER and JOHN HENRY CUNNINGHAM, citizens of the United States, residing at Ludell, in the county of Rawlins and State of Kansas, have invented certain new and useful Improvements in Vehicle Brake-Gears; and we do hereby declare the following to be a full, clear, and exact description of the invention, such as will enable others skilled in the art to which it appertains to make and use the same.

This invention relates to a brake-gear for vehicles; and it consists in the novel construction and combination of the parts, as hereinafter fully described and claimed, whereby the action of the brake is rendered steady and continuous in descending hills.

In the drawings, Figure 1 is a side view of a vehicle with one of the wheels removed and having the brake-steadying gear applied to it. Fig. 2 is a detailed plan view from below of the brake-steadying gear.

A is the body of a vehicle provided with wheels B, axles C, and springs D, all of which are of ordinary construction.

E are ordinary brake-block brackets provided with a pair of vertical eyes, $g$, and bolted to the under side of vehicle-body A; and $e$ is a brake-shaft journaled in the said brackets, and also journaled in an ordinary brake-lock bracket, K, bolted to the center of the under side of vehicle-body A. The brake is also provided with the brake-block $e'$ on the end of the crank-arm, and a hand or foot lever for pressing the said brake-block against the wheel in the ordinary manner.

It is found that in descending hills the action of the springs will prevent the brake-blocks from bearing with an even pressure against the wheel, when the brake-handle is held steady and a jerky motion will be imparted to the vehicle from the wheels, alternately leaving and then suddenly pressing hard against the brake-blocks. It is also found that in descending and ascending hills the vibration of the vehicle-body backward and forward is destructive to bolts, springs, and spring-bars. To overcome this the following device is employed:

F is an axle-yoke having a pair of vertical eyes, $f$, one of which yokes is securely clipped to each end of axle of the vehicle in line with double-eyed bracket E. The brake-shaft brackets E are similarly provided with pair of vertical eyes $g$, and H H' are right and left hand screw-rods provided with single eyes $h$ at one end. These single eyes are coupled to the vertical eyes $f$ and $g$ by the pins $h'$, so that the rods H H' are free to vibrate.

I is a coupling-link provided with right and left hand screw-threaded holes, with which the said screws H H' engage. Two complete sets of this brake-steadying gear are used, one set being attached to each brake-shaft bracket at each side of the vehicle-body.

The distance between the center of the brake-shaft and center of the axle is adjusted by turning the coupling-link I, and after once being adjusted it remains constant, so that the pressure of the brake-block is necessarily always uniform. The vertical eye-and-pin connections at the ends of screw-rods allow the springs to have free play in a vertical direction, so that the vehicle will run as easily as it would if no gear for steadying the action of the brake were employed.

What we claim is—

The combination, with a vehicle having a vertically-moving axle and a brake, substantially as set forth, of the brake-bracket secured to the body of the vehicle, the clip secured to the axle, the right and left hand screw-threaded rods, the pivot-pins connecting the said rods to the brake-bracket and to the axle-clip, respectively, and permitting the said axle to move vertically, and the adjustable coupling-link provided with right and left hand screw-threaded holes for the screwed ends of the said rods, substantially as set forth.

In testimony whereof we affix our signatures in presence of two witnesses.

CHARLES FULLER.
JOHN HENRY $\times$ CUNNINGHAM.
<sub>his</sub> <sub>mark.</sub>

Witnesses:
E. D. YORK,
WM. CHEESAY.